United States Patent
Yang

(10) Patent No.: US 7,355,803 B2
(45) Date of Patent: Apr. 8, 2008

(54) METHOD AND APPARATUS FOR OPTIMIZING HARD DISC DRIVE AND/OR RECORDING MEDIUM FOR THE SAME

(75) Inventor: Won-choul Yang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 304 days.

(21) Appl. No.: 10/876,869

(22) Filed: Jun. 28, 2004

(65) Prior Publication Data

US 2004/0264030 A1    Dec. 30, 2004

(30) Foreign Application Priority Data

Jun. 26, 2003    (KR) ...................... 10-2003-0042139

(51) Int. Cl.
G11B 27/36    (2006.01)
G11B 5/09    (2006.01)
(52) U.S. Cl. .............................. 360/31; 360/53; 360/69
(58) Field of Classification Search ..................... None
See application file for complete search history.

(56) References Cited

U.S. PATENT DOCUMENTS 5,729,399 A * 3/1998 Albrecht et al. .............. 360/75

2002/0114092 A1 * 8/2002 Yang ............................ 360/31
2003/0072100 A1 * 4/2003 Lee et al. ..................... 360/53

FOREIGN PATENT DOCUMENTS

| KR | 1999-71161 | 9/1999 |
| KR | 2002-67794 | 8/2002 |
| KR | 2003-25688 | 3/2003 |

OTHER PUBLICATIONS

Notice to Submit Response issued by the Korean Intellectual Property Office on Jun. 30, 2005 in Application No. 10-2003-0042139.

* cited by examiner

*Primary Examiner*—Thang V. Tran
*Assistant Examiner*—Daniell L. Negrón
(74) *Attorney, Agent, or Firm*—Staas & Halsey LLP

(57) ABSTRACT

A method and apparatus for optimizing a hard disc drive, in which parameters of the hard disc drive are updated by periodically performing a retry of the hard disc drive when the hard disc drive is in an idle state and using the accumulated results, and a recording medium that stores programs of the method. The method includes periodically calculating parameter values to optimize the operation of the hard disc drive and applying the optimized parameters calculated in the calculation of optimization parameters to the operation of the hard disc drive.

14 Claims, 4 Drawing Sheets

METHOD AND APPARATUS FOR OPTIMIZING HARD DISC DRIVE AND/OR RECORDING MEDIUM FOR THE SAME

CROSS-REFERENCE TO RELATED APPLICATION

This application claims the priority of Korean Patent Application No. 2003-42139, filed on Jun. 26, 2003, in the Korean Intellectual Property Office, the disclosure of which is incorporated herein in herein by reference.

BACKGROUND OF THE INVENTION

1. Field of the Invention

The present invention relates to a method of optimizing a hard disc drive, and more particularly, to an optimizing method, which revises parameters of the hard disc drive by periodically performing a retry of the hard disc drive when the hard disc drive is in an idle state and using the accumulated result of the retries, an apparatus suitable for the method, and a recording medium suitable for the method.

2. Description of the Related Art

A hard disc drive can be used in various environments, however, when the hard disc drive is used in poor surroundings, for example, a tropical area or an arctic area, functioning of the hard disc drive may severely worsen. Also, the functioning of the hard disc drive may worsen due to a change in mechanical characteristics over a certain period of time. Therefore, it is important to optimize the hard disc drive so that the hard disc drive can always operate with excellent performance despite a change in conditions and/or the time used.

Performance of the hard disc drive is optimized by adjusting various parameters of a controlling operation of the hard disc drive, and especially, parameters of a read/write channel. Examples of these parameters are a cutoff frequency, a bandwidth, an FIR (Finite Inverse Response) filter gain, etc.

The hard disc drive is shipped after a rough optimization is performed in each zone and head at a given temperature, usually at normal temperatures, in a burn-in test process. Since this rough optimization is performed in a limited time period, a limited environment of a chamber, and at a limited temperature, it is nearly impossible to cover every environment where the hard disc drive can be installed.

When the hard disc drive is operated by using parameter values calculated in the burn-in test process, an error rate increases if the burn-in test environment does not match an environment in which the hard disc drive is used. Head characteristics of the hard disc drive may decrease due to use, and mechanical characteristics of the hard disc drive may change according to the time used. Optimization of the hard disc drive in the environment in which it is used is necessary for a low error rate.

For this purpose, in the burn-in test process, after testing many drives in low and high temperature conditions, a temperature dependent statistical distribution of each parameter is obtained. Thereafter, an approximate optimization is performed by applying the statistical distribution according to the temperature condition in which the hard disc drive is actually used.

In detail, in a prior hard disc drive, an ambient temperature is measured by a temperature sensing unit, a difference between the measured temperature and a temperature in the burn-in test process is calculated, and parameter values, which are adjusted in the burn-in test process in relation to the temperature difference, are readjusted by applying a temperature dependent statistical distribution. At this time, the parameters applying the temperature dependent statistical distribution are usually limited to a few basic parameters of all of the parameters. Optimizing methods are disclosed in Korean Patent Publication No. 2002-67794 (laid open Aug. 24, 2002) and No. 1999-71161 (laid open Sep. 15, 1999) by the present applicant.

However, since a prior optimizing method is simply performed by the temperature dependent statistical distribution, appropriate optimization cannot be performed to correspond to characteristic differences of each apparatus and/or a change of the hard disc drive according to time. Also, since optimization is performed only for a few basic parameters of all of the parameters, exact optimization cannot be performed.

The hard disc drive may be optimized through an error recovery process, i.e., a retry. Data written in the hard disc drive is written per sector unit. If a data read/write of a desired sector fails in a data read/write process, the hard disc drive retries to read/write the data in the desired sector by a disk's rotation, and this is called a retry. In this process, the read/write is retried after some parameters are adjusted. Such a retry method is disclosed in Korean Patent Publication No. 2003-25688 (laid open Mar. 29, 2003) by the present applicant.

However, this retry method is only performed when the hard disc drive fails to read/write data in the desired sector, and since the number of retries is limited in most cases, the retries frequently fail in actual cases; therefore, appropriate optimization of the hard disc drive is not performed.

SUMMARY OF THE INVENTION

The invention provides an improved optimizing method of a hard disc drive.

The invention also provides a hard disc drive suited for the optimizing method.

The invention also provides a recording medium of recording programs suited for the optimizing method.

According to an aspect of the invention, there is provided a method of optimizing a hard disc drive, including: in a method of optimizing various parameters needed for operation of the hard disc drive, periodically calculating parameter values to optimize the operation of the hard disc drive; and applying the optimized parameters calculated in the calculation of optimization parameters to the operation of the hard disc drive.

According to an aspect, the applying includes: counting the number of times that the calculation of the optimization parameters is consecutively performed without an error; and updating parameter values applied to the operation of the hard disc drive using values obtained by the calculation when the number of times is larger than a predetermined value.

According to another aspect of the present invention, there is provided a hard disc drive including: a memory which stores default parameter tables having parameters needed for operating a read channel, which reads data from a disc, and a write channel, which converts data to be written on the disc; a timer which generates time information; and a controller which controls the operation of the read channel and the write channel with reference to the default parameter tables stored in the memory.

The controller sets optimization parameter tables by periodically calculating parameter values to optimize the operation of the hard disc drive, storing the tables to the memory, counting the number of times the calculation of optimization parameters is consecutively performed without an error, and updating the default parameter tables stored in the memory with the optimization parameter tables when the number of times is larger than a predetermined value.

According to another aspect of the present invention, there is provided a recording medium having programs controlling the operation of a hard disc drive, including: periodically calculating parameter values to optimize the operation of the hard disc drive; counting the number of times that the calculation of optimization parameters is consecutively performed without an error; and updating parameter values applied to the operation of the hard disc drive with values obtained in the calculation, when the number of times is larger than a predetermined value.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the present invention will become more apparent and more readily appreciated from the following description of the embodiments, taken in conjunction with the accompanying drawings of which.

DETAILED DESCRIPTION OF THE PREFERRED EMBODIMENTS

Figure 1:
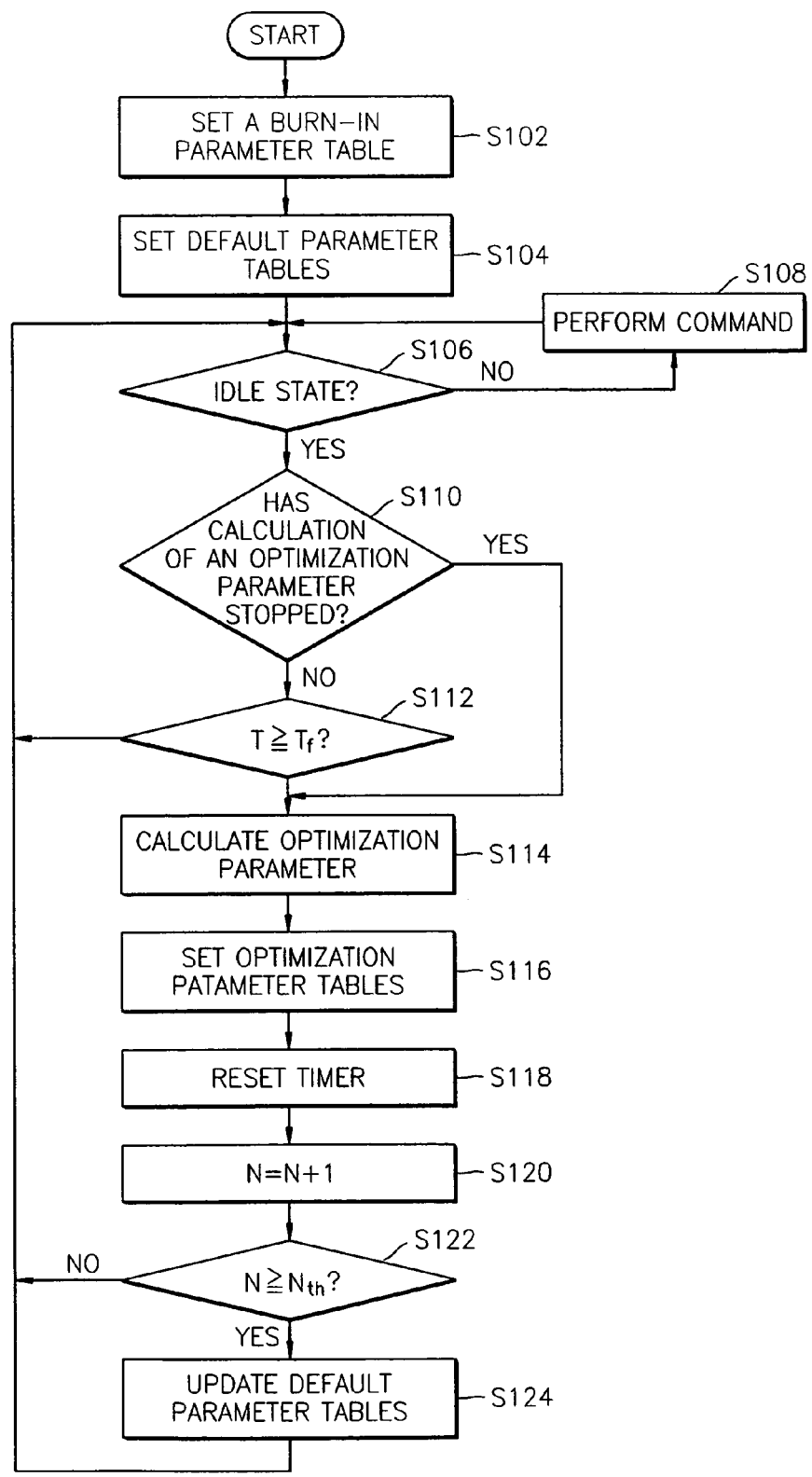
FIG. 1 is a flowchart of a method of optimizing a hard disc drive according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

In general, when a hard disc drive is being manufactured, the following processes are performed: a servo write process, a function test process, a burn-in test process, etc. In the servo write process, position information is written on a disc. In the function test process, defects in a maintenance cylinder and a read/write possibility of a data area are judged. In the burn-in test process, defects of the data area are judged. Also, in the burn-in test process, read channel optimization to optimize a read channel of the hard disc drive and write channel optimization to optimize a write channel of the hard disc drive are performed. The optimizing method is performed by a controller of the hard disc drive.

A feature of the optimizing method according to the present invention is to periodically calculate optimization parameters. This calculation of the optimization parameters is performed in an idle state, and the optimized parameters are decided under an environment in which the hard disc drive is used. The hard disc drive may go into an idle state when an instruction from a host is not input for more than a fixed period of time, for example, around 15~20 seconds after the instruction from the host has been executed.

Since the optimizing method according to the present invention calculates the optimized parameter values during the idle state, the method hardly creates difficulty in use of the hard disc drive. Also, it only takes a few hours to optimize all parameters of the hard disc drive, however, since optimization of the hard disc drive is mostly performed in the idle state, the method does not create any difficulty in operation of the hard disc drive responding to an instruction from the host.

The calculation of the optimization parameters is periodically performed, and accordingly, a change of the hard disc drive according to time may be effectively dealt with. If a retry is generated by a read error or a write error, then a period of the calculation is calculated again from the retry time.

Another feature of the optimizing method according to the present invention is to count the number of times the calculation of optimization is consecutively performed without an error and to update default parameters applied to the operation of the hard disc drive only when the count value is larger than a predetermined value. In a case where the retry is generated by a read error or a write error, the default parameters applied to the operation of the hard disc drive are immediately updated. The parameters set as a default are parameters of the hard disc drive used during the operation.

These default parameters are obtained by applying the temperature dependent statistical distribution to the parameters obtained in the burn-in test process at the initial use of the hard disc drive and may be updated by parameters obtained in the calculation of the optimization parameters thereafter. The parameters obtained in the burn-in test process are stored in a maintenance cylinder of the disc, and they may be referred to in a later reset process. Likewise, by applying the parameters obtained in the burn-in test process and the temperature dependent statistical distribution, a reliable standard to calculate the optimized parameter values under any condition for use is obtained.

Also, by the optimizing method according to the present invention, a change of a hard disc drive according to time may be effectively dealt with by changing the default parameters with the parameters calculated in the calculation of the optimization parameters during the predetermined number of times of calculating the optimization parameters, that is, only when an error is not generated for a fixed period of time.

FIG. 1 is a flowchart of a method of optimizing the hard disc drive according to the invention. With reference to FIG. 1, a burn-in parameter table, which has parameters and the parameter values obtained in a burn-in test process, is set, and the burn-in parameter table is stored in the memory in operation S102.

Next, default parameter tables, which have default parameters applying a temperature dependent statistical distribution to the parameters obtained in the burn-in test process, are set, and the default parameter tables are stored in the memory in operation S104. The default parameter tables are referred to when the hard disc drive is operating.

An idle state of the hard disc drive is judged in operation S106. If the hard disc drive is not in the idle state, that is, if an instruction is input from a host, the instruction is performed in operation S108, and the hard disc drive waits until it is in the idle state. Even though the period of time without an instruction is within a fixed time, that is, within the time to go to the idle state, the hard disc drive will wait until it is in the idle state.

If the hard disc drive is in the idle state, whether a deferred calculation of the optimization parameters exists is judged in operation S110. This operation is performed to prepare for a case where the calculation has been deferred by an instruction from a host while calculating the optimization parameters in the idle state. Since the calculation of the optimization parameters in the idle state performed by the present invention does not have a direct relationship with an instruction of a host different from a prior retry, that is, a retry performed when a read error or a write error is generated, if an instruction of a host is input while performing the calculation, optimization is deferred so that the instruction can be performed, and optimization is resumed if the hard disc drive goes to the idle state.

If the calculation of the optimization parameters has been deferred, the deferred calculation of the optimization parameters is resumed by proceeding to operation S114.

If the calculation of the optimization parameters has not been deferred, a period of time for performing the calculation of the optimization parameters (T>=Tf) is judged in operation S112, where T is the time having passed after the former calculation of the optimization parameters has finished, and is known by referring to a timer, and Tf is a period of time for performing the calculation of the optimization parameters. The calculation of the optimization parameters can be performed non-periodically. For example, the number of times that an error is generated in the hard disc drive is counted, and if a count value becomes a predetermined value, the calculation of the optimization parameters may be performed. However, in order to effectively deal with a change of the hard disc drive according to time, it is preferable for the calculation of the optimization parameters to be performed periodically. This period of time can be designated experientially and/or statistically by a designer; however, about 3~4 days is considered adequate.

If the period of time to perform the calculation of the optimization parameters is not satisfied, the hard disc drive returns to operation S106. The period of time for the calculation of the optimization parameters is known by referring to the timer, and if the time of the timer reaches a fixed value, that is, if the period of time to perform the calculation of the optimization parameters is satisfied, the calculation of the optimization parameters is performed.

The calculation of the optimization parameters is performed in operation S114. In the calculation of the optimization parameters, various types of parameters for optimization are obtained. In the calculation of the optimization parameters, it is preferable that the optimization is performed for all parameters related to the operation of the hard disc drive.

The calculation of the optimization parameters optimizes a signal input from the head by adjusting a filter value, a FIR value, a boost value, and a bias current by performing the well known ACRO (Adaptive Channel Read Optimization) process. Also, a temperature dependent MR current, a phase compensation, and a bias current are checked.

Optimization parameter tables, which contain the optimized parameter values obtained when calculating the optimization parameters, are set, and the optimization parameter tables are stored in the memory in operation S116. The optimization parameter tables can be prepared for each temperature, and temperature information for the optimization parameter tables is supplied by the temperature sensing unit.

The timer is reset as soon as the calculation of the optimization parameters is finished in operation S118.

The number of times the calculation of the optimization parameters is consecutively performed without an error is counted in operation S120.

The number of times the calculation of the optimization parameters is consecutively performed without an error is judged in operation S122 as to whether it is larger than a predetermined value (N>=Nth), where N is the number of times the calculation of the optimization parameters is consecutively performed without an error, and Nth is a comparison value to decide whether to update the default parameter table.

If the number of times the calculation of the optimization parameters is consecutively performed without an error is larger than a predetermined value, the corresponding default parameter table is updated in operation S124 by the optimization parameter table of an applied temperature.

Figure 2:
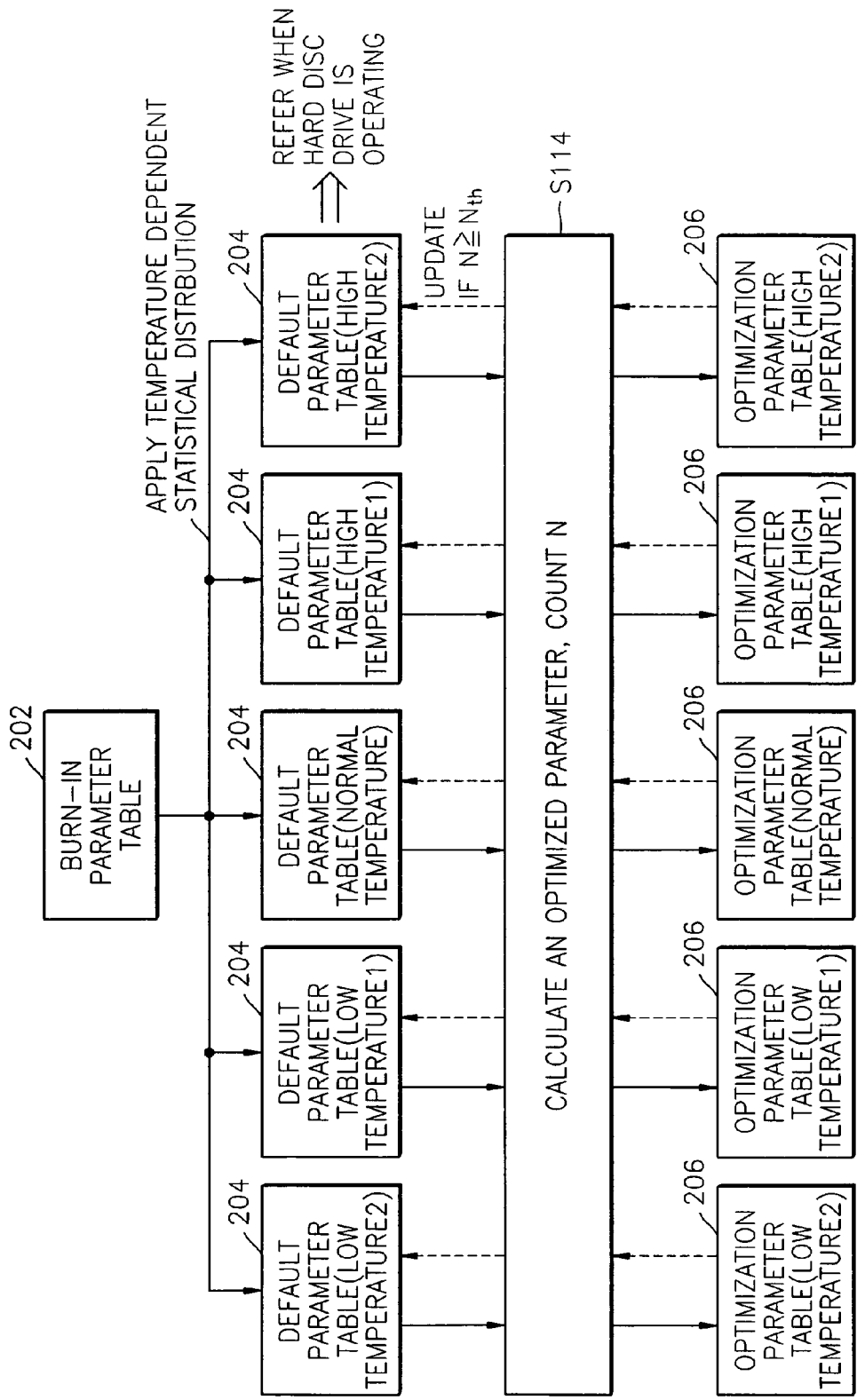
FIG. 2 shows a relationship among a burn-in parameter table, default parameter tables, and optimization parameter tables in the optimizing method according to FIG. 1.

FIG. 2 shows a relationship among the burn-in parameter table, the default parameter tables, and the optimization parameter tables in the optimizing method according to the present invention shown in FIG. 1.

The parameters obtained in the burn-in test process are commonly stored in a maintenance cylinder (MC), and values copying the parameters are set in a burn-in parameter table 202. Otherwise, the parameters stored in the MC can be used as the burn-in parameter tables 202 without copying.

Default parameter tables 204 are obtained by applying temperature dependent statistical distribution to the burn-in parameters obtained in the burn-in test process, and multiple default parameter tables can be set for a few representative temperature values.

For example, the burn-in parameter table 202 can have optimized parameters under the condition of 20° C., and the default parameter tables 704 can be written for −15° C., 0° C., 20° C., 40° C., and 60° C. by applying the temperature dependent statistical distribution to the burn-in parameter table 202.

These default parameter tables 204 are referred to while the hard disc drive operates. That is, the default parameter tables 704 are referred to when the hard disc drive reads or writes data. The temperature sensing unit supplies the temperature information of the present user environment, and the hard disc drive selects and uses the default parameter table 704 suited to the temperature.

The calculation of the optimization parameters in operation S114 is performed with reference to the parameters that are contained in the default parameter table 204 used in the present user environment, and the optimization parameters obtained by the result are stored in the corresponding optimization parameter tables 206. However, the optimization parameters obtained in the calculation of the optimization parameters are not immediately applied to the default parameter tables 204.

The default parameter tables 204 are updated by the optimization parameter tables 206 only when the number of times N the calculation of the optimization parameters is consecutively performed without an error is larger than the predetermined value Nth. The number of times can be set appropriately by a designer, and it is preferable that the number of times is a value reflecting a change of the hard disc drive according to time.

Figure 3:
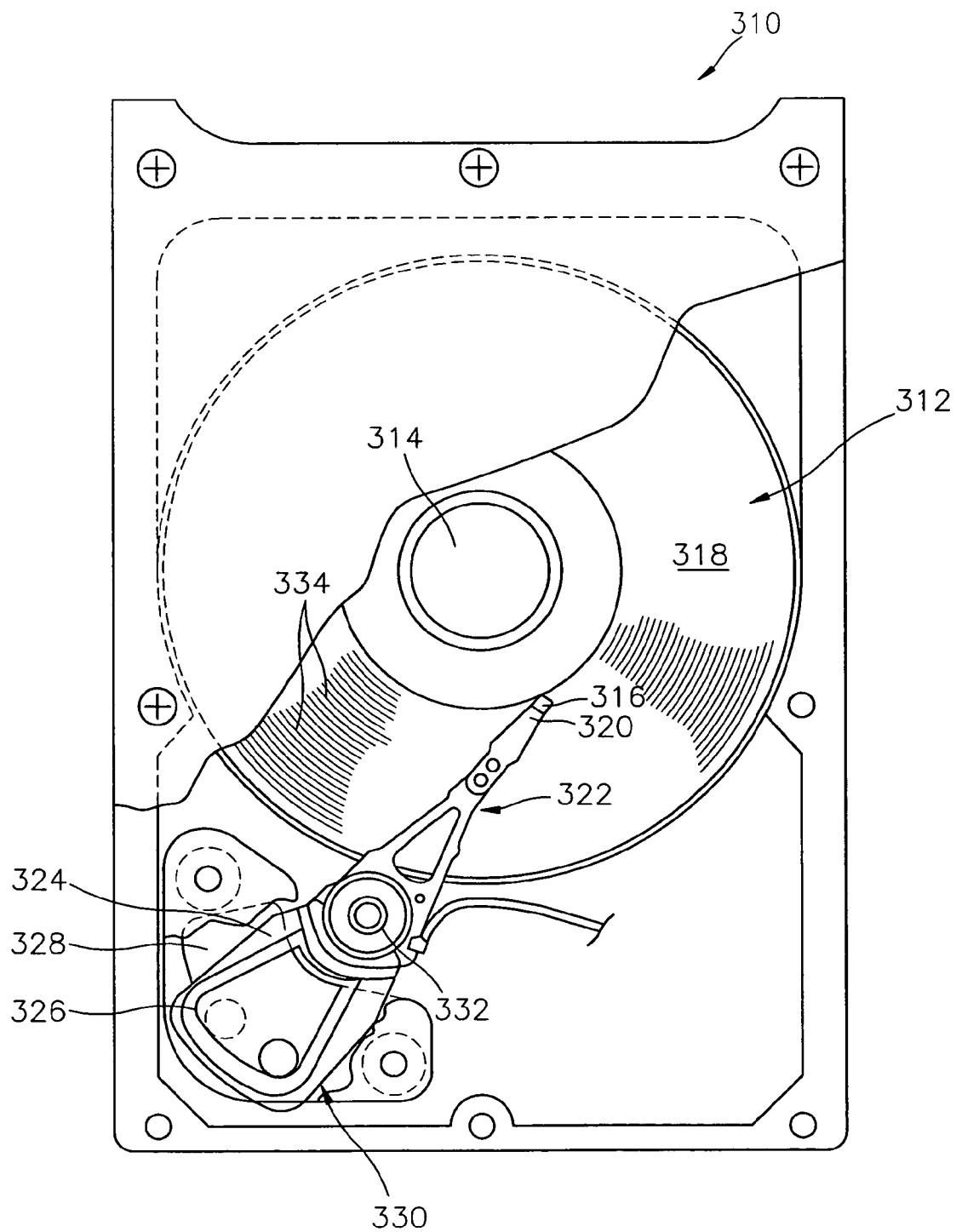
FIG. 3 is a schematic structure of a mechanical portion of a hard disc drive according to the present invention.

FIG. 3 is a schematic structure of a mechanical portion of a hard disc drive according to the present invention. A drive 310 includes at least one magnetic disc 312 rotated by a spindle motor 314. The drive 310 also includes a converter 316 adjacent to a disc surface 318.

The converter 316 can read or write information from/on the rotating disc 312 by sensing a magnetic field of each disc 312 and magnetizing it. Typically, the converter 316 is combined with each disc surface 318. Though one converter 316 is shown and described, the converter 316 includes a writing converter to magnetize the disc 312 and a reading converter to sense a magnetic field of the disc 312. The reading converter is made up of magneto-resistive (MR) elements.

The converter 316 can be unified with a slider 320. The slider 320 has a structure generating an air bearing between the converter 316 and the disc surface 318. The slider 320 is combined with a head gimbal assembly 322. The head gimbal assembly 322 is attached to an actuator arm 324 having a voice coil 326. The voice coil 326 lies adjacent to a magnetic assembly 328 specifying a VCM (Voice Coil Motor) 330. A current supplied to the voice coil 326 generates a torque revolving the actuator arm 324 on a bearing assembly 332. The rotation of the actuator arm 324 moves the converter 316 across the disc surface 318.

Information is typically stored in ring-shaped tracks on the disc 312. Each track 334 generally includes multiple sectors. The converter 316 moves across the disc surface 318 in order to read or write information in another track.

Figure 4:
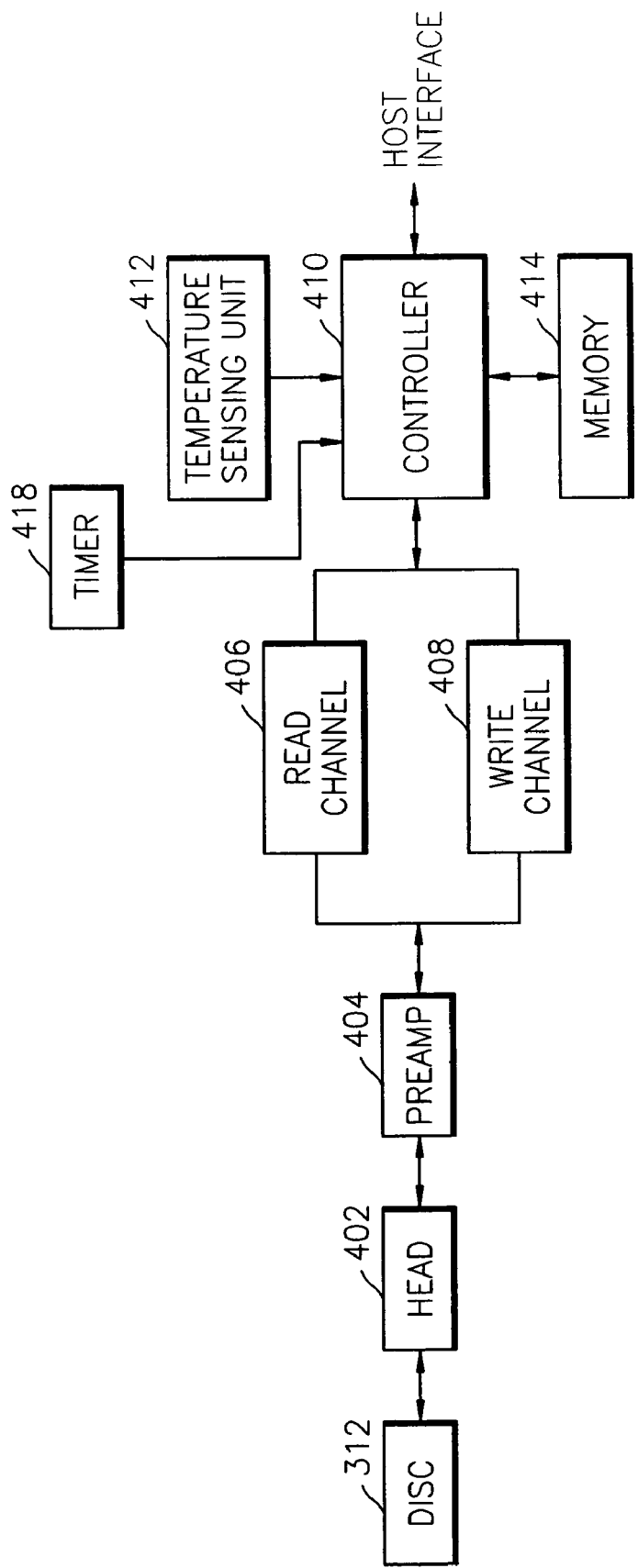
FIG. 4 is a block diagram of an electronic portion of a hard disc drive according to the present invention.

FIG. 4 is a block diagram of an electronic portion of a hard disc drive according to the present invention. An apparatus shown in FIG. 4 includes a head 402, a preamp (preamplifier) 404, a read channel 406, a write channel 408, a controller 410, a temperature sensing unit 412, a memory 414, and a timer 418.

When data is read from the hard disc drive, a signal read from the disc 312 via the head 402 (a magnetic head or an MR head) is amplified by the preamp 404 so as to easily process a signal, the amplified analog signal is modulated to a digital signal readable by a host computer (not shown) in the read channel 406, and the digital signal is transmitted to the host computer via a host interface.

When data is written in the hard disc drive, user data is received from the host computer via the host interface, the data is converted to an electrical analog signal in the write channel 408, and a write current signal amplified by the preamp 404 is written on the disc 312 via the head 402 (a magnetic head).

As described above, the read channel 406 amplifies and modulates the current signal read by the head 402 and converts the current signal to digital data.

Since a data error rate increases unless this converting process is performed appropriately, the performance of the read channel 406 largely influences the performance of the hard disc drive.

The feature of the read channel 406 is decided by adjustable multiple channel factors, for example, a filter cutoff (FC), a filter boost (FB), a data threshold (DT), and a window shift (WS).

The following is a description of a phenomenon generated according to a change in temperature during which the hard disc drive is used. As an embodiment, when an environment, in which the hard disc drive is used, changes from a normal temperature to a low temperature, the following change in features occurs:

A crown of a slider rises due to a phenomenon where epoxy, which is used as adhesives between the slider and a suspension, shrinks, and a flying height of the head becomes higher.

A coercive force Hc of the disc increases to about 15 A/m.

A resistor change rate $\Delta R/R$ of the MR head decreases.

A non-linear transmission shift (NLTS) of the head is changed.

As a result, the following parameter values must be changed in order to correct the change of features of the hard disc drive according to the temperature change.

A write boost length is changed in order to compensate the change in the flying height, the change in the coercive force, and the change in the NLTS. That is, when a temperature changes to a low temperature, a rising time of a write current is reduced by changing the write boost length.

To compensate the change in the flying height and the change in the NLTS, a write precomp control value changes.

To compensate a resistor change rate $\Delta R/R$ of the MR head, a read bias current value increases when the temperature changes to the low temperature.

To compensate the change in the flying height and the change in the coercive force, a write current value increases when the temperature changes to the low temperature.

Therefore, to compensate a performance change in the hard disc drive according to a temperature change, a parameter related to a write process, which includes a write current decision factor, a write boost decision factor, and a write precomp factor, and a read bias current factor parameter are decided on the basis of experiments and statistics so that optimized performance is performed at an ambient temperature while considering a performance change according to a temperature change.

The memory 414 stores various types of parameter values related to the operation of the hard disc drive, the measured temperature information, information related to a temperature of a burn-in process, and correction information on a parameter related to a write process, which includes a write current decision factor, a write boost decision factor, and a write precomp factor according to a temperature, and a read bias current factor parameter. The parameter values stored in the memory 414 as initial values are the optimized parameter values decided in the burn-in process, which is one process among the hard disc drive manufacturing processes.

The temperature sensing unit 412 is an element that senses the internal temperature of the hard disc drive and generates temperature information corresponding to a sensed temperature value by including a temperature sensor.

The controller 410 updates the temperature information input from the temperature sensing unit 412 into the memory 414 with a constant time interval in an idle mode of a power on state, compares the updated temperature information in the memory 414 with a critical temperature range corresponding to the same conditions as that for the burn-in process, and when the updated temperature information exceeds the critical temperature range, a process is performed to change a parameter related to a write, which includes a write current decision factor, a write boost decision factor, and a write precomp factor, and a read bias current factor parameter, that is, temperature dependent parameters of parameters stored in the memory 414 to parameter values corresponding to the exceeding temperature.

The memory 414 stores various parameter values related to the operation of the hard disc drive, the measured temperature information, the information related to the temperature of the burn-in test process, and the temperature dependent statistical distribution information.

And more particularly, the memory 414 stores the burn-in parameter table, the default parameter tables, and the optimization parameter tables shown in FIG. 2. The burn-in parameter table has the optimized parameter values obtained in the burn-in test process, which is one of the processes for manufacturing the hard disc drive.

The temperature sensing unit 412 is an element for sensing the internal temperature of the hard disc drive and generates temperature information corresponding to a sensed temperature value by including a temperature sensor.

The timer 418 generates time information, and the temperature sensing unit 412 detects a temperature of use of the hard disc drive.

The controller 410 updates the temperature information input from the temperature sensing unit 412 into the memory 414 with a constant interval.

If a period of time to perform the calculation of the optimization parameters is satisfied, the controller 410 performs optimization by performing the method shown in FIG. 1. The period of time to perform the calculation of the optimization parameters is decided with reference to the timer 418. The timer 418 is reset as soon as the former calculation of the optimization parameters is finished, and the controller 410 decides whether to execute the calculation of the optimization parameters performed with reference to the time of the timer 418.

If the hard disc drive is installed, the controller 410 sets the default parameter tables with reference to the burn-in parameter table recorded in the MC, and stores the default parameter tables in the memory 414. Then, the controller 410 performs a read/write operation of the hard disc drive with reference to the default parameter tables.

The burn-in parameter table is set in the burn-in test process and stored in the MC of the hard disc drive.

If the calculation of the optimization parameters is performed after the hard disc drive enters the idle state, the optimization parameter tables obtained by the result are stored in the memory 414. Also, the number of times the calculation of the optimization parameters is consecutively performed without an error is counted. If the number of times exceeds the predetermined value, the controller 410 updates the corresponding default parameter tables with the optimization parameter tables set by the result of the calculation of the optimization parameters.

According to the optimizing method of the present invention, the initial default parameter tables are obtained by applying temperature dependent statistical distribution to the parameters obtained in the burn-in test process. However, if the number of times the calculation of the optimization parameters is consecutively performed without an error exceeds the predetermined value, that is, when there is no error even after the calculation of the optimization parameters is performed using the default parameter tables for a fixed period of time, the default parameter tables are updated by the optimization parameter tables.

If an error is generated while a read/write operation is performed, the contents of the default parameter tables are updated by the prior retry method.

The invention may be embodied by a method, an apparatus, and a system. When the invention is embodied using software, elements of the invention are expressed by code segments performing a necessary work. Programs or code segments may be stored in a process readable medium, and/or transmitted by computer data signals combined with carrier waves in transmission media or communication networks. The process readable medium includes all medium that can store and/or transmit the information. Examples of the process readable medium are an electronic circuit, a semiconductor memory device, a Read Only Memory (ROM), a flash memory, an Erasable ROM (EROM), a floppy disc, an optical disc, a hard disc, an optical fiber medium, an RF (Radio Frequency) network, etc. The computer data signals include all signals that can be transmitted via a transmission medium, such as an electronic network channel, an optical fiber, the air, an electronic field, an RF network, etc.

While the invention has been particularly shown and described with reference to exemplary embodiments thereof, it will be understood by those of ordinary skill in the art that various changes in form and details may be made therein without departing from the spirit and scope of the present invention as defined by the following claims.

For example, the optimizing method according to the invention may be used not only for optimization of a read/write channel, but also for optimization of a servo system.

The optimizing method according to the invention may be used to optimize the hard disc drive so that the hard disc drive can always operate with excellent performance regardless of a change in conditions and the time used, and may also used to optimize a servo system.

As described above, the method of optimising the hard disc drive according to the invention more effectively optimizes the hard disc drive by periodically performing optimization process in the idle state.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of updating parameters for operating a hard disc drive, comprising:
    periodically calculating parameter values to update the operation of the hard disc drive; and
    applying the updated parameter values calculated in the calculation of parameters to the operation of the hard disc,
    wherein the applying of the updated parameters comprises counting a number of times that the calculation of an updated parameters is consecutively performed without an error, and updating values of parameters applied to the operation of the hard disc drive using values obtained in the calculation when the number of times that the calculation of the updated parameters is consecutively performed without an error is larger than a predetermined value.

2. The method of claim 1, wherein the calculation is performed in an idle state of the hard disc drive.

3. The method of claim 2, further comprising initializing the parameters applied to the operation of the hard disc drive by applying a temperature dependent statistical distribution to parameters obtained in a burn-in test process after the hard disc drive is installed.

4. A method of updating parameters for operating a hard disc drive, comprising:
    setting default parameter tables according to temperatures by applying a temperature dependent statistical distribution to parameters obtained in a burn-in test process;
    calculating parameter values to periodically update an operation of the hard disc drive in an idle state, and storing the calculated updated parameter values in updated parameter tables;
    counting a number of times that the calculation of updated parameter values is consecutively performed without an error; and
    updating the default parameter tables with the updated parameter tables when the number of times that the calculation of updated parameters is consecutively performed without an error is larger than a predetermined value.

5. A hard disc drive comprising:
- a memory storing default parameter tables having parameters needed for operating a read channel, which reads data read from a disc, and a write channel, which converts data to be written on the disc;
- a timer generating time information; and
- a controller controlling the operation of the read channel and the write channel with reference to the default parameter tables stored in the memory,
- wherein the controller sets updated parameter tables by periodically calculating parameter values to update the operation of the hard disc drive, storing the updated parameter tables to the memory, counting a number of times that the calculation of updated parameters is consecutively performed without an error, and updating the default parameter tables stored in the memory with the updated parameter tables when the number of times that the calculation of updated parameters is consecutively performed without an error is larger than a predetermined value.

6. The hard disc drive of claim 5, wherein the controller performs the calculation in an idle state of the hard disc drive.

7. The hard disc drive of claim 6, further comprising a temperature sensing unit detecting an operating temperature of the hard disc drive,
- wherein the controller initializes the default parameters applied to the operation of the hard disc drive by applying a temperature dependent statistical distribution to parameters obtained in a burn-in test process after the hard disc drive is installed, and updates the corresponding default parameters according to temperatures with reference to a detected result of the temperature sensing unit.

8. A method of controlling an operation of a hard disc drive, using a recording medium having recording programs, the method comprising:
- periodically calculating parameter values to update the operation of the hard disc drive;
- counting the number of times that the calculation of updated parameters is consecutively performed without an error; and
- updating parameter values applied to the operation of the hard disc drive with values obtained in the calculation, when the number of times that the calculation of updated parameters is consecutively performed without an error is larger than a predetermined value.

9. The method of claim 8, wherein the calculation of the updating parameters is performed in an idle state of the hard disc drive.

10. The method of claim 9, wherein the parameter values applied to the operation of the hard disc drive are initialized by applying a temperature dependent statistical distribution to parameter values obtained in a burn-in test process after the hard disc drive is installed.

11. A method of updating performance of a hard disk drive by controlling parameters of a controlling operation of the hard disk drive needed for operating the hard disk drive, comprising:
- calculating updated parameters corresponding to a measured operating temperature of the hard disk drive while the hard disk drive is in an idle state; and
- adjusting default parameters of the controlling operation to reflect the calculated updated parameters of the hard disk drive,
- wherein the adjusting default parameters of the controlling operation comprises:
  - counting a number of times the updated parameters are calculated consecutively without resulting in an error;
  - updating default parameters of the hard disk drive used during operation of the hard disk drive when the quantity of counts exceeds a predetermined value.

12. The method of claim 11, further comprising updating performance of the hard disk drive through an error recovery process, wherein the error recovery process is only performed when the hard disk drive fails to read/write data in a desired sector.

13. The method of claim 11, further comprising calculating updated parameter values by periodically comparing T, a period of time having passed after a prior calculation of the updated parameters, with $T_f$, a predetermined period of time for performing the calculation of updated parameters, such that the updated parameters are updated by the updated parameter table of an applied temperature if $T \geq T_f$.

14. The method of claim 11, wherein the default parameters are initially obtained by applying a temperature dependent statistical distribution to the parameters obtained in the calculation during a burn-in process after the hard disk drive is installed.

* * * * *